US012680641B1

(12) United States Patent
Luo et al.

(10) Patent No.: US 12,680,641 B1
(45) Date of Patent: Jul. 14, 2026

(54) TUBE FITTING CAPABLE OF QUICK ASSEMBLY AND DISASSEMBLY

(71) Applicant: Guangdong Meijie Faucet Company Limited, Dongguan (CN)

(72) Inventors: Xiaohua Luo, Dongguan (CN); Huaitong Deng, Dongguan (CN); Jiabin Yang, Dongguan (CN)

(73) Assignee: Guangdong Meijie Faucet Company Limited, Dongguan (CN)

( * ) Notice: Subject to any disclaimer, the term of this patent is extended or adjusted under 35 U.S.C. 154(b) by 0 days.

(21) Appl. No.: 19/029,120

(22) Filed: Jan. 17, 2025

(30) Foreign Application Priority Data

Jan. 14, 2025 (CN) .......................... 202510058118.8

(51) Int. Cl.
| *F16L 37/086* | (2006.01) |
| *F16L 37/084* | (2006.01) |
| *F16L 37/133* | (2006.01) |
| *F16L 37/088* | (2006.01) |

(52) U.S. Cl.
CPC ......... *F16L 37/133* (2013.01); *F16L 37/0841* (2013.01); *F16L 37/084* (2013.01); *F16L 37/086* (2013.01); *F16L 37/0885* (2019.08)

(58) Field of Classification Search
CPC ... F16L 37/133; F16L 37/084; F16L 37/0841; F16L 37/086; F16L 37/0885
See application file for complete search history.

(56) References Cited

U.S. PATENT DOCUMENTS

| 6,206,435 | B1 * | 3/2001 | Le Clinche | ......... F16L 37/0841 |
| | | | | 285/305 |
| 12,158,224 | B2 | 12/2024 | Baba et al. | |
| 12,163,612 | B2 | 12/2024 | Phillips et al. | |
| 2009/0167018 | A1 * | 7/2009 | Lien | ..................... F16L 37/0841 |
| | | | | 285/308 |
| 2024/0392902 | A1 | 11/2024 | Larson et al. | |

FOREIGN PATENT DOCUMENTS

| CN | 112524357 A | 3/2021 | |
| CN | 222209340 U | 12/2024 | |
| DE | 4220924 C1 * | 7/1993 | ............. A47L 9/242 |
| FR | 2753774 A1 * | 3/1998 | .......... F16L 37/0841 |
| WO | WO-2021038162 A1 * | 3/2021 | |

OTHER PUBLICATIONS

Zhang, Chun-xia, CN-108571631-B, Mar. 29, 2024. (Year: 2024).*

* cited by examiner

*Primary Examiner* — Matthew Troutman
*Assistant Examiner* — James A Linford

(57) ABSTRACT

A tube fitting capable of quick assembly and disassembly includes a joint, a plug-in tube, and a buckle; the joint includes a tube body and a connector provided at an end of the tube body; an accommodating cavity is provided in the connector, an inserting opening is provided on a side wall of the connector, and a tube inserting hole is provided in a top wall of the connector; the accommodating cavity is in communication with the inner cavity of the tube body, the inserting opening, and the tube inserting hole; the buckle is passed through the inserting opening, inserted into the connector and clamped therewith, partially accommodated in the accommodating cavity, and partially exposed outside the connector.

6 Claims, 5 Drawing Sheets

TUBE FITTING CAPABLE OF QUICK ASSEMBLY AND DISASSEMBLY

FIELD OF THE DISCLOSURE

The present disclosure relates to the technical field of tube fittings, particularly, to a tube fitting capable of quick assembly and disassembly.

BACKGROUND OF THE DISCLOSURE

The connection between tubes is generally achieved through joins. In existing technology, the connection between tubes is often achieved through the internal and external threads of the joins and the tube. When installing and disassembling, the tube must be rotated along the thread. After the thread slides, it often leads to unstable connection and detachment.

The Chinese utility model patent CN222209340U discloses a new type of water pipe connector, which includes a first connecting part with a flange, an external thread part, a step part, a second connecting part with an internal threaded part, an extension part, a polygonal part, and a protruding part. The extension part is located on the side of the polygonal part. The external threaded part and the internal threaded part are matched to provide the force point for rotating the second connecting part. The axis of the first connecting part coincides or is parallel to that of the second connecting part, providing a water pipe quick connector that reinforces the connecting position and avoids disconnection. This connecting method requires rotating the second connecting part during installation and disassembly, which is laborious and difficult to operate with one hand. Thus, it is impossible to achieve quick assembly and disassembly.

SUMMARY OF THE DISCLOSURE

To overcome the shortcomings of existing technology, the present disclosure provides a tube fitting capable of quick assembly and disassembly, The tube fitting includes a joint, a plug-in tube, and a buckle. The plug-in tube is inserted into the joint, and the plug-in tube and the joint are quickly installed or disassembled through the buckle.

The technical solutions in the present disclosure are as follows:

A tube fitting capable of quick assembly and disassembly includes a joint, a plug-in tube, and a buckle; the joint includes a tube body and a connector provided at an end of the tube body; an accommodating cavity is provided in the connector, an inserting opening is provided on a side wall of the connector, and a tube inserting hole is provided in a top wall of the connector; the accommodating cavity is in communication with the inner cavity of the tube body, the inserting opening, and the tube inserting hole; the buckle is passed through the inserting opening, and inserted into the connector and clamped therewith, partially accommodated in the accommodating cavity, and partially exposed outside the connector. During installation, the buckle is inserted into the connector from the inserting opening into the accommodating cavity, and the plug-in tube is inserted into the accommodating cavity from the tube inserting hole and pushes the buckle so that the buckle is clamped with the connector and the plug-in tube at the same time, thereby achieving a quick, fixed connection between the plug-in tube and the connector; during disassembly, an external force is used to press the buckle to release the buckle from the clamped connection between the connector and the plug-in tube, and the plug-in tube is pulled out of the connector, whereby quick disassembly of the plug-in tube from the connector is accomplished.

Preferably, the middle of the buckle is provided with a buckle hole; the plug-in tube passes through the buckle hole before entering the inner cavity of the tube body; the opposite two side walls of the buckle hole are respectively provided with a pressing portion and a clamped portion; the pressing portion is exposed outside of the connector; the positive projection of the clamping portion is located inside the tube inserting hole; the plug-in tube enters the tube inserting hole, pushes the clamping portion and clamped with it.

Preferably, two first clamping protrusions are respectively provided at opposite two sides of the buckle hole of the pressing portion; two clamping slots are respectively provided at opposite two side walls of the connector; when the buckle is inserted into the connector from the inserting opening, the opposite two side walls of the connector and the first clamping protrusions are in an interference fit, and pressed against each other; when the first clamping protrusions move to the clamping slots, the first clamping protrusions are inserted into the clamping slots and clamped therewith, so that the buckle is fixedly connected to the connector.

Preferably, the first clamping protrusion includes a connecting arm extended from the pressing portion, and an end of the connecting arm extends a clamping head toward the inner wall of the connector, the clamping head is inserted into the clamping slot and clamped therewith.

Preferably, an avoiding space is disposed among the first clamping protrusion, the wall of the buckle hole, and the clamping slot.

Preferably, two second clamping protrusions are provided on the wall of the buckle hole; two blocks are respectively provided on the cavity wall of the accommodating cavity; the blocks cooperate with the second protrusions to limit the position of the buckle.

Preferably, the buckle further has two elastic portions protruding from the wall of the buckle hole opposite to the pressing portion; the two elastic portions are obliquely opposite to each other, and elastically abut against the cavity wall of the accommodating cavity.

Preferably, the plug-in tube includes a main body, and an outer wall of the main body is provided with a notch groove; the plug-in tube is inserted into the tube inserting hole, and enters the buckle hole of the buckle to push the clamping portion and clamped therewith.

Preferably, one groove wall of the notch groove is an oblique surface formed by the out wall of the main body in an inclined and downward direction, the hole wall of the buckle hole also has an oblique fitting surface, guiding the clamping portion to enter the notch groove and be clamped therewith.

Preferably, two ends of the tube body of the joint are respectively provided with the connector and the buckle, which are respectively connected to the plug-in tube.

The beneficial effects of the present disclosure are as follows: During assembly, the plug-in tube synchronously presses and clamps a buckle during the process of inserting into the joint so that the buckle clamps the connector and the plug-in tube at the same time to realize a fixed connection. During disassembly, only the buckle needs to be pressed, in this way, the buckle can be released from the clamped state with the connector and the plug-in tube, and the plug-in tube can be pulled out of the connector. The assembly and disassembly are quick and easy to operate.

BRIEF DESCRIPTION OF THE DRAWINGS

In order to explain more clearly the technical scheme in the embodiment of the present disclosure, a brief introduction is given below to the attached drawings needed in the embodiment. Obviously, the attached drawings in the following description are only some embodiments of the present disclosure, for ordinary technicians in this field, other drawings can be obtained according to these drawings without paying creative labor.

DETAILED DESCRIPTION OF ILLUSTRATED EMBODIMENTS

Figure 1:
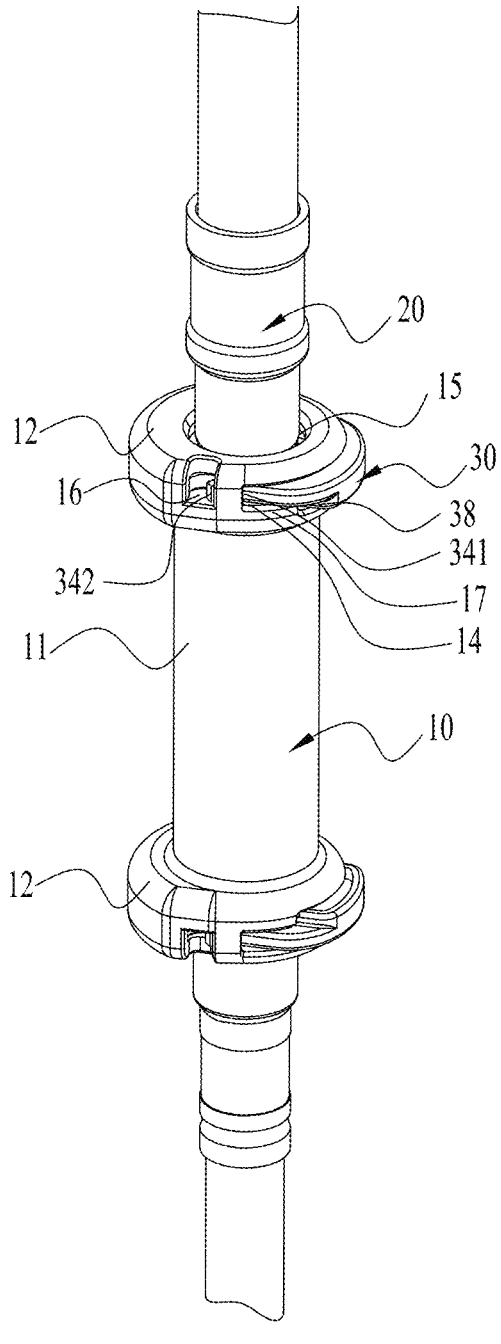
FIG. 1 is a perspective view of the tube fitting capable of quick assembly and disassembly in the present disclosure.

To make the objectives of the present disclosure and the technical solutions and technical effects clearer, the following further describes the present disclosure with reference to specific embodiments. It should be understood that the embodiments described herein are only intended to explain the present disclosure, but not to limit the present disclosure.

Referring to FIGS. 1-5, a tube fitting capable of quick assembly and disassembly includes a joint 10, a plug-in tube 20, and a buckle 30. The plug-in tube 20 is inserted into the joint 10 to quickly install and disassemble by the buckle 30. The joint 10 includes a tube body 11 and a connector 12 provided at the end of the tube body 11. An accommodating cavity 13 is provided in the connector 12, an inserting opening 14 in communication with the accommodating cavity 13 is provided on a side wall of the connector 12, and a tube inserting hole 15 in communication with the accommodating cavity 13 is provided in a top wall of the connector 12. The accommodating cavity 13 is in communication with the inner cavity of the tube body 11. The tube inserting hole 15 and the inner cavity of the tube body 11 are in communication with each other and share a central axis. The buckle 30 is inserted into the connector 12 and clamped therewith, partially accommodated in the accommodating cavity 13, and partially exposed outside the connector 12.

During installation, the buckle 30 is inserted into the connector 12 from the inserting opening 14 into the accommodating cavity 13, and the plug-in tube 20 is inserted into the accommodating cavity 13 from the tube inserting hole 15 and pushes the buckle 30, so that the buckle 30 is clamped with the connector 12 and the plug-in tube 20 at the same time, thereby achieving a quick, fixed connection between the plug-in tube 20 and the connector 10. During disassembly, an external force is used to press the buckle 30 to release the buckle 30 from the snap-fitted connection between the connector 12 and the plug-in tube 20, and the plug-in tube 20 is pulled out of the connector 12, whereby quick disassembly of the plug-in tube from the connector is accomplished.

During assembly, the plug-in tube 20 synchronously presses and clamps the buckle 30 during the process of inserting into the joint 10, so that the buckle 30 clamps the connector 12 and the plug-in tube 20 at the same time to realize a fixed connection. During disassembly, only the buckle 30 needs to be pressed, in this way, the buckle 30 can be released from the clamped state with the connector 12 and the plug-in tube 20, and the plug-in tube 20 can be pulled out of the connector 12. The assembly and disassembly are quick and easy to operate.

Figure 2:
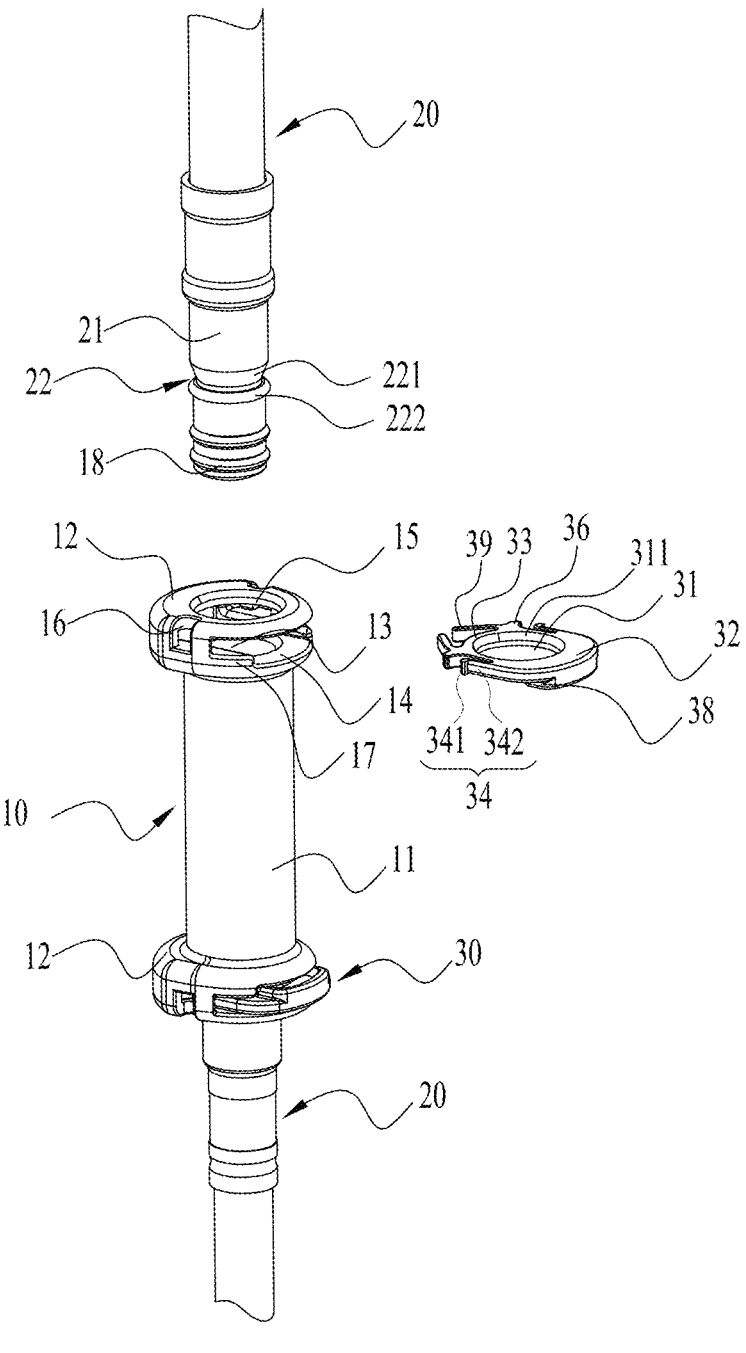
FIG. 2 is an exploded view of the tube fitting capable of quick assembly and disassembly in the present disclosure.
Figure 3:
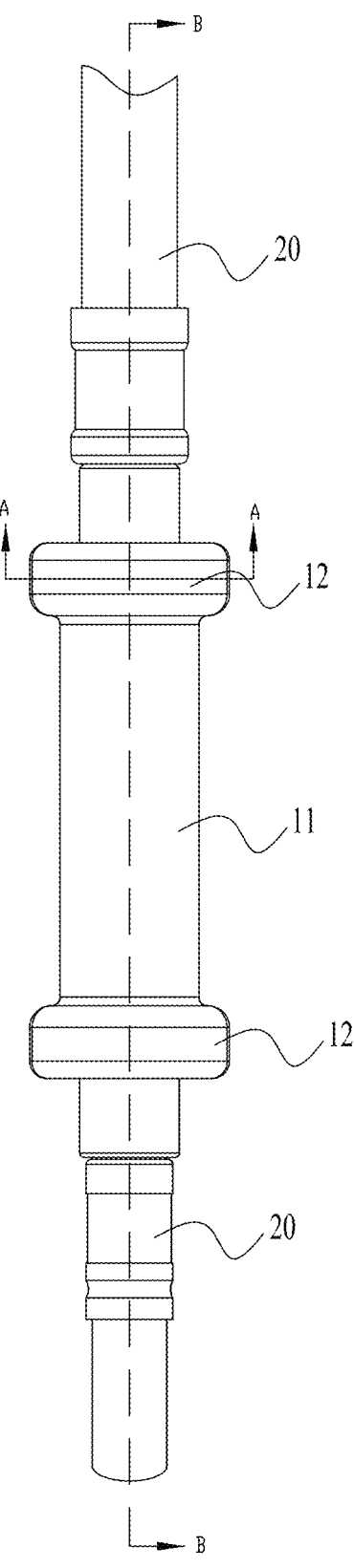
FIG. 3 is a front view of the tube fitting capable of quick assembly and disassembly in the present disclosure.
Figure 4:
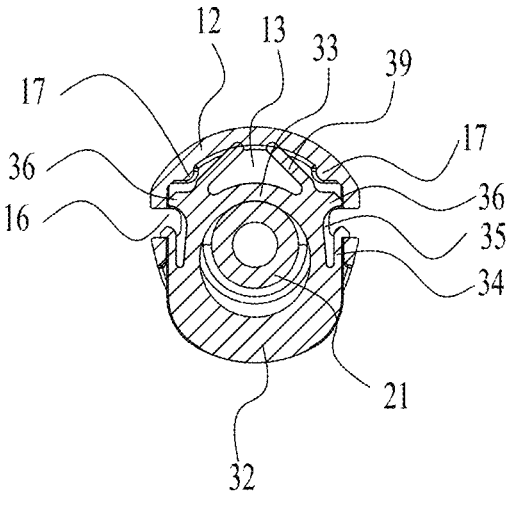
FIG. 4 is a sectional view along the A-A line in FIG. 3.

In an embodiment in the disclosure, referring to FIGS. 2 and 4, the middle of the buckle 30 is provided with a buckle hole 31. The plug-in tube 20 passes through the buckle hole 31 before entering the inner cavity of the tube body 11. The opposite two side walls of the buckle 30 are respectively provided with a pressing portion 32 and a clamped portion 33. The pressing portion 32 is exposed outside of the connector 12. The positive projection of the clamping portion 33 is located inside the tube inserting hole 15. The plug-in tube 20 enters the tube inserting hole 15, pushes the clamping portion 33 to make its positive projection outside the tube inserting hole 15, passes through the buckle hole 31, and enters the tube body 11 of the connector 12.

Two first clamping protrusions 34 are respectively provided at opposite two sides of the buckle hole 31 of the pressing portion 32. Two clamping slots 16 are respectively provided at opposite two side walls of the connector 12. When the buckle 30 is inserted into the connector 12 from the inserting opening 14, the opposite two side walls of the connector 12 and the first clamping protrusions 34 are in an interference fit, and pressed against each other. When the first clamping protrusion 34 moves to the clamping slot 16, the first clamping protrusion 34 is inserted into the clamping slot 16 and is clamped therewith so that the buckle 30 is fixedly connected to the connector 12.

Specifically, the first clamping protrusion 34 includes a connecting arm 341 extended from the pressing portion 32, and an end of the connecting arm 341 extends a clamping head 342 toward the inner wall of the connector 12. When the buckle 30 is inserted into the connector 12 from the inserting opening 14, the side wall of the connector 12 and the clamping head 342 are pressed against each other; when the clamping head 342 moves to the clamping slot 16, the clamping head 342 is inserted into the clamping slot 16 and clamped therewith; and the connecting arm 341 and the side wall of the connector 12 are fitted with each other, so that the buckle 30 is fixedly connected to the connector 12.

Preferably, an avoiding space 35 is disposed among the first clamping protrusion 34, the wall of the buckle hole 31, and the clamping slot 16. When the pressing portion 32 is pressed into the accommodating cavity 13 by an external force, the avoiding space 35 provides a movable space for the first clamping protrusion 34 to detach from the clamping slot 16 so that the first clamping protrusion 34 can successfully release the clamping state with the connector 12.

Preferably, two second clamping protrusions 36 are provided on the wall of the buckle hole 31. Two blocks 17 are respectively provided on the wall of the accommodating cavity 13. The blocks 17 cooperate with the second protrusions 36 to limit the position of the buckle 30 and prevent it from excessively entering the accommodating chamber 13.

Preferably, the middle edge of the pressing portion 32 is of a circular arc shape, and the connecting arm 341 is of a flat and straight structure, thereby facilitating the insertion of the buckle 30 into the inserting opening 14.

Preferably, the top face or the bottom face of the pressing portion 32 is provided with a limiting plate 38, and a baffle 17 is provided at the inserting opening 14. The baffle 17 blocks the limiting plate 38 so as to limit the position where the buckle 30 is inserted into the connector 12 so that a part thereof is exposed outside the connector 12.

Preferably, the buckle 30 further has two elastic portions 39 protruding from the wall of the buckle hole opposite to the pressing portion 32. The two elastic portions 39 are obliquely opposite to each other, and elastically abut against the cavity wall of the accommodating cavity 13. The pressing portion 32 of the buckle hole 31 is pressed towards the accommodating cavity 13 so that the first clamping protrusions 34 are detached from the clamping slots 16 and the clamping portion 33 is separated from the plug-in tube 20. At this point, the elastic portions 39 of the buckle 30 elastically abut against the wall of the accommodating cavity 13, after the insertion tube 20 are drawn out and the pressing portion 32 is released, under the action of the elastic force of the elastic portions 39, the buckle 30 is reset, and the first clamping protrusions 34 and the clamping slots 16 are mutually clamped. The buckle 30 and the connector 12 return to the clamping connection.

Figure 5:
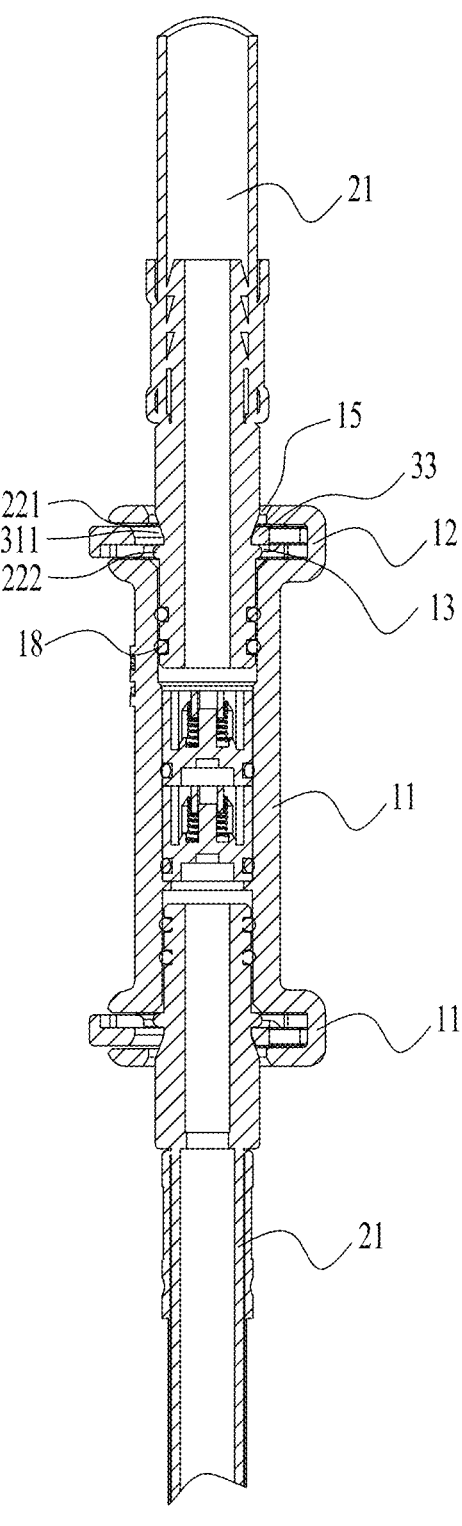
FIG. 5 is a sectional view along the B-B line in FIG. 3.

Referring to FIGS. 2 and 5, the plug-in tube 20 includes a main body 21, and an outer wall of the main body 21 is provided with a notch groove 22. The plug-in tube 20 is inserted into the tube inserting hole 15, when it enters the buckle hole 31 of the buckle 30, the plug-in tube 20 pushes the clamping portion 33 to make the positive projection of the clamping portion 33 outside the tube inserting hole 15. One groove wall of the notch groove 22 is an oblique surface 221 formed by the out wall of the main body 11 in an inclined and downward direction. Correspondingly, the hole wall of the buckle hole 31 also has an oblique fitting surface 311. During the plug-in tube 20 is inserted into the main body 11, the oblique surface 221 and the oblique fitting surface 311 match with each other, guiding the clamping portion 33 to enter the notch groove 22 and be mutually clamped therewith.

Preferably, the other groove wall of the notch groove 22 is a convex ring 222 around the tube wall. When the clamping portion 33 enters the notch groove 22, the convex ring 222 and the oblique surface 221 clamp the clamping portion 33 from the upper side and the lower side, so that the inserting tube 20 is fixedly connected to the buckle 30.

Preferably, a spring 18 is further provided between the main body 11 and the inserting tube 20, and is used for elastically pushing the inserting tube 20 out of the inserting tube 20 after the clamping connection between the inserting tube 20, the connector 12 and the plug-in tube 30 is released.

Preferably, the two ends of the main body 11 of the joint 10 are respectively provided with the described connector 12 and the described buckle 30, which are respectively connected to the described inserting tube 20.

When the tube fitting 10 capable of quick assembly and disassembly is installed, the buckle 30 is first inserted into the accommodating cavity 13 of the connector 12 through the inserting opening 14 on the side wall of the connector 12, so that the first clamping protrusions 34 and the clamping grooves 16 are mutually clamped, and the positive projection of the clamping portion 33 of the buckle hole 31 is located in the tube inserting hole 15. The plug-in tube 20 is inserted into the accommodating cavity 13 from the tube plug-in hole 15, the clamping portion 33 is pressed and pushed so that the positive projection thereof is located outside the tube plug-in hole 15, and the notch groove 22 is clamped with the clamping portion 33, so that the plug-in tube 20 is fixedly connected to the connector 10 via the buckle 30. When the tube fitting 10 capable of quick assembly and disassembly is disassembled, press the pressing portion 32 of the buckle hole 31 into the accommodating cavity 13, so that the first clamping protrusion 34 is separated from the clamping groove 16, the clamping portion 33 is detached from the notch groove 22 on the inserting tube 20, and the elastic portion 39 of the clamping buckle 30 elastically abuts against the cavity wall of the accommodating cavity 13, pulling out the inserting tube 20, releasing the pressing portion 32, and under the action of the elastic force of the elastic portion 39, the buckle 30 is reset, the first clamping protrusion 34 is clamped with the clamping slot 16.

The above is a further detailed description of the disclosure in combination with a specific preferred embodiment, and it can't be concluded that the specific implementation of the disclosure is limited to these instructions. For the general technical personnel in the technical field to which the disclosure belongs, without being separated from the conception of the disclosure, the architecture form can be flexible and changeable, and a series of products can be derived. If it is just making a number of simple deductions or substitutes should be regarded as falling within the scope of patent protection determined by the claim submitted by the present disclosure.

What is claimed is:

1. A tube fitting capable of quick assembly and disassembly, comprising a joint, a plug-in tube, and a buckle; said joint includes a tube body and a connector provided at an end of said tube body; wherein an accommodating cavity is provided in said connector, an inserting opening is provided on a side wall of said connector, and a tube inserting hole is provided in a top wall of said connector; said accommodating cavity is in communication with an inner cavity of said tube body, said inserting opening, and said tube inserting hole; said buckle is passed through said inserting opening, inserted into said connector and clamped therewith, partially accommodated in said accommodating cavity, and partially exposed outside said connector; during installation, said plug-in tube is inserted into said accommodating cavity from said tube inserting hole and pushes said buckle so that said buckle is clamped with said connector and said plug-in tube at the same time, thereby achieving a quick, fixed connection between said plug-in tube and said connector; during disassembly, said buckle is pressed to release said buckle from said connector and said plug-in tube, and said plug-in tube is pulled out of said connector whereby quick disassembly of said plug-in tube from said connector is accomplished;

a middle of said buckle is provided with a buckle hole; said plug-in tube passes through said buckle hole before entering said inner cavity of said tube body; opposite two side walls of said buckle hole are respectively provided with a pressing portion and a clamped portion; said pressing portion is exposed outside of said connector; said clamping portion is located inside said tube inserting hole; said plug-in tube enters said tube inserting hole, pushes said clamping portion and clamped therewith;

two first clamping protrusions are respectively provided at opposite two sides of said buckle hole of said pressing portion; two clamping slots are respectively provided at opposite two side walls of said connector; when said buckle is inserted into said connector from said inserting opening, said opposite two side walls of said connector and said first clamping protrusions are in an interference fit, and pressed against each other; when said first clamping protrusions move to said clamping slots, said first clamping protrusions are inserted into said clamping slot and clamped therewith, so that said buckle is fixedly connected to said connector;

two second clamping protrusions are provided on a hole wall of said buckle hole; two blocks are respectively provided on said cavity wall of said accommodating cavity; said blocks cooperate with said second protrusions to limit said buckle;

a top face or a bottom face of said pressing portion is provided with a limiting plate, and a baffle is provided at said inserting opening; said baffle blocks said limiting plate so as to limit a position where said buckle is inserted into said connector so that a part thereof is exposed outside said connector; wherein an avoiding space is disposed among said first clamping protrusion, a hole wall of said buckle hole, and said clamping slot.

2. The tube fitting capable of quick assembly and disassembly according to claim 1, wherein said first clamping protrusion includes a connecting arm extended from said pressing portion and an end of said connecting arm extends a clamping head toward an inner wall of said connector, said clamping head is inserted into said clamping slot and clamped therewith.

3. The tube fitting capable of quick assembly and disassembly according to claim 1, wherein said buckle further has two elastic portions protruding from said hole wall of said buckle hole opposite to said pressing portion; said two elastic portions are obliquely opposite to each other, and elastically abut against said cavity wall of said accommodating cavity.

4. The tube fitting capable of quick assembly and disassembly according to claim 1, wherein said plug-in tube includes a main body, and an outer wall of said main body is provided with a notch groove; said plug-in tube is inserted into said tube inserting hole, and enters said buckle hole of said buckle to push said clamping portion and clamped therewith.

5. The tube fitting capable of quick assembly and disassembly according to claim 4, wherein one groove wall of said notch groove is an oblique surface formed by an out wall of said main body in an inclined and downward direction, said hole wall of said buckle hole also has an oblique fitting surface, guiding said clamping portion to enter said notch groove and be clamped therewith.

6. The tube fitting capable of quick assembly and disassembly according to claim 1, wherein two ends of said tube body of said joint are respectively provided with said connector and said buckle, which are respectively connected to said plug-in tube.

* * * * *